May 21, 1963  R. H. SPELMAN  3,090,417
RADIAL CORD TRUCK TIRE
Filed Feb. 23, 1961  2 Sheets-Sheet 1

INVENTOR
Rollin H. Spelman

BY McCoy, Greene + te Grotenhuis
ATTORNEYS

United States Patent Office 3,090,417
Patented May 21, 1963

3,090,417
RADIAL CORD TRUCK TIRE
Rollin H. Spelman, Akron, Ohio, assignor to The General Tire & Rubber Company, Akron, Ohio, a corporation of Ohio
Filed Feb. 23, 1961, Ser. No. 91,154
4 Claims. (Cl. 152—354)

The present invention relates to pneumatic tires. More particularly, this invention relates to an improved pneumatic tire employing a radial cord carcass construction.

A radial cord or radial ply tire construction is one in which the individual cords of the reinforcing or carcass ply are radially disposed as seen in a cross section of the tire. As thus viewed the individual cords in the tread portion of the tire will be parallel to the axis of rotation of the tire while the individual cords in the side wall portion of the tire will define a radius of the tire or wheel proper. Another way of defining a radial tire is to say that the individual cords precede in the shortest route from bead to bead in travling through the carcass portion of the tire.

It has been recognized for some time that a tire construction employing a radial ply represents in theory a very strong and desirable construction. The reason for this is that the forces imposed on the tire are opposed most efficiently by this. It, of course, has also been known that a tire construction employing a radial cord ply is inherently unstable in operation with the result that the operator of the automobile to which attached will experience a veering sensation. In attempts to avoid the instability of these types of tires, resort has been made to a "beefing up" of the tire radially outward of the carcass but inward of the tread. One form of "beefing up" has been the employment of a plurality of wire cord breaker strips. These strips are usually coextensive with the lateral dimension of the tread and create a peripheral band, the stiffness of which provides stability. This, unfortunately, in turn leads to a harder ride. The peripheral bands also put a considerable burden upon the bead portion of the tire.

With the foregoing in mind it is an object of the present invention to provide a radial ply tire which meets all of the foregoing inherent problems.

It is another object of the present invention to provide a pneumatic tire which employs a carcass ply construction using radially disposed cords yet is possessed of very advantageous flex life leading to long service and a soft ride.

It is another particular object of the present invention to provide a radial type tire employing peripheral stiffening means and yet is not possessed of the usual bead chafing problems frequently encountered from other constructions.

It is still another object of the present invention to provide a tire which includes all of the foregoing advantages and yet at the same time is light in weight.

These and other objetcts and advantages of the present invention are apparent from the following description and drawings, in which.

The objects enumerated above and others are accomplished by a unique construction as hereinafter more particularly described, but the principal features of which comprise a carcass composed of at least two plies, the cords of which extend radially and from bead to bead, each cord being composed of large gauge synthetic material, at least two inextensible annular bead members in each rim-engaging portion of the tire, circumferential restricting means located radially outwardly and adjacent to the outermost of the radial plies and a tread defined by two side-by-side, crowned ground-engaging bands extending throughout the said tread circumference and being separated by a central groove.

Figure 1:
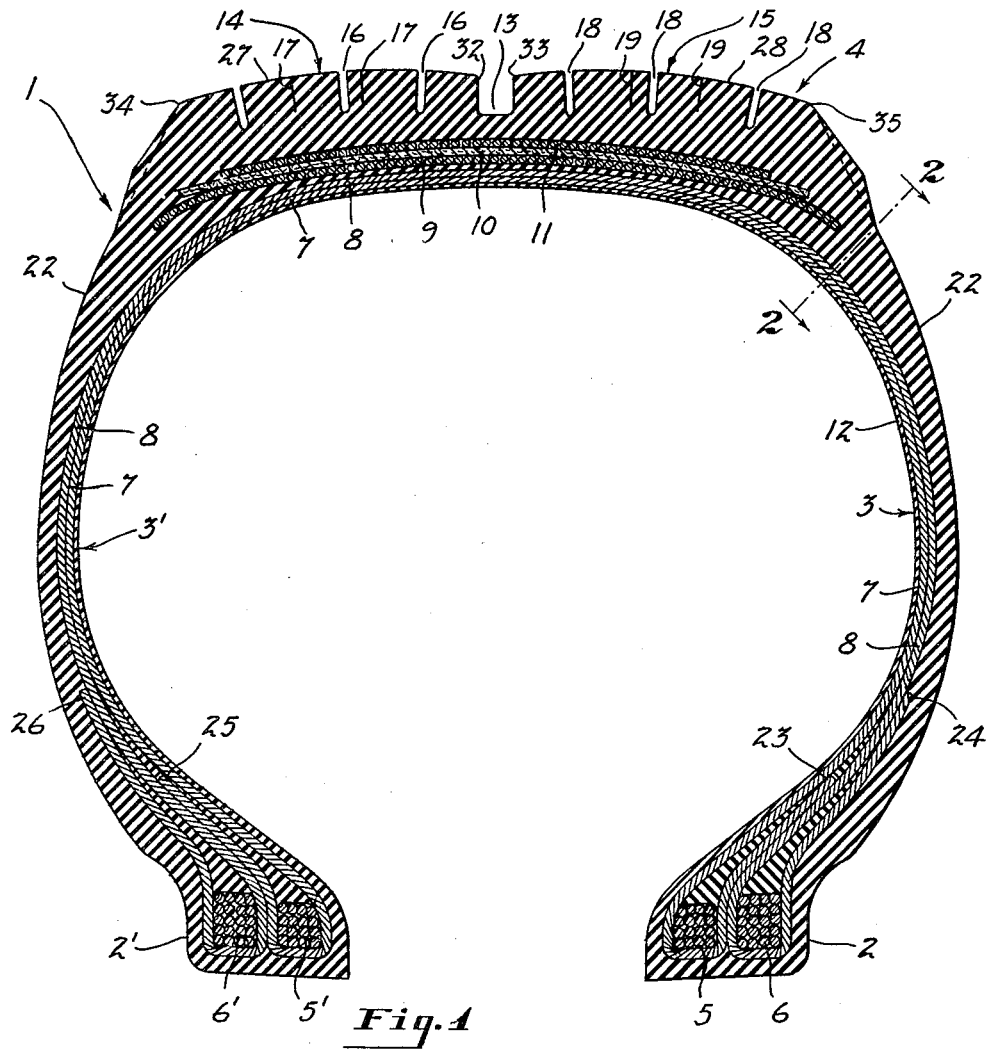
FIGURE 1 is a cross sectional view of the pneumatic tire of the present invention.

Referring now more particularly to the drawings, it can be seen that the pneumatic tire 1 of the present invention comprises spaced bead portions 2 and 2' incorporated in a casing which comprises a sidewall portion 3, a tread portion 4, and another sidewall portion 3'. Bead portion 2 is composed of two side-by-side inextensible annular wire bead rings 5 and 6. Bead portion 2' is similarly composed of inextensible annular wire bead rings 5' and 6'. Bead rings 5 and 5' are the inner bead rings while bead rings 6 and 6' are the outer bead rings (closest to the rim in assembled form). The carcass portion of the tire contains an inner layer of rubber 12 and an outer rubber portion 22 as is conventional between which plies 7 and 8 are disposed. These plies will be defined in more detail later. It can be seen that inner ply 7 and outer ply 8 extend from the right-hand bead rings 5 and 6 around the tire carcass inside the tread over to the left-hand bead rings 5' and 6'. The end of the plies are wrapped around the bead rings and lap back upon themselves as shown in FIG. 1. The right-hand end 23 of ply 7 nests between plies 7 and 8. The right-hand end 24 of ply 8 nests on the outer surface of ply 8. The left-hand ends 25 and 26 of plies 7 and 8 are similarly disposed as shown.

While two radial ply layers are preferred, it is contemplated that three or more radial ply layers may be used with large truck tires and off-the-road tires.

The tread portion 4 of the tire defines a left-hand ground-engaging band 14 and a right-hand ground-engaging band 15 with a narrow central circumferentially continuous groove 13 between the two bands. The bands are identical. Each is crowned and extends from inner side edges 32 and 33 close to the center line of the tire adjacent the central groove 13 to the respective outer side edges 34 and 35 of the ground-engaging surface. Each tread band is of greater radial thickness at its outer side edge and gradually decreases in radial thickness toward the central groove 13. Each band has convex or crowned ground-engaging faces 27 and 28 in cross section and gradually increases in diameter in the plane of the tire in a direction axially outwardly from the center and inwardly from the outer side edge to provide a point of maximum diameter intermediate the edges of each band. The tread is of less width than the maximum width of the tire.

Immediately radially outward of and adjacent the radial plies 7 and 8 and substantially inward of the tread bands 14 and 15, are means for circumferentially restricting and stabilizing the tire comprising a first wire ply layer 9, an intermediate layer of wire filaments and rubber 10, and a second wire ply layer 11. These layers together form a substantially inextensible cylinder or band which also stabilizes the tire. The wire ply layers 9 and 11 are bias cut and are assembled so that the angles of the wires therein are oppositely inclined and define an angle of approximately 20 degrees with the groove 13. The angle made by these two plies with groove 13 may be anywhere from 15 to 35 degrees, an angle in the neighborhood of 20 degrees being preferred, as illustrated. In addition to stabilizing the tire, the layers 9, 10 and 11 also serve as a breaker strip assembly to resist puncturing and bruising of the carcass beneath.

The layer 10 comprises a network of short lengths of resilient steel wires 20 embedded in a matrix 29 of relatively stiff rubber stock. The short lengths of resilient steel wire are made by shearing brass-plated, steel wires or twisted cables to about ⅝-inch lengths. The gauge of the individual wires should be in the order of .006 inch. The lengths of wire are mixed into the rubber matrix on a mill and a flat sheet thereof is stripped off. The total weight of the lengths of wire may comprise from 15 percent to 50 percent of the weight of the material of layer 10, about 35 percent being preferred. The wire lengths may vary from ¼ inch to 2 inches long, about ⅝ inch being preferred.

The wire and rubber combination material forming layer 10 should have limited extensibility and should be strong. At 100% elongation it should have a tensile strength of at least 3500 p.s.i. and preferably 5000 p.s.i. The rubber of layer 10 should be a highly reinforced, stiff stock which is capable of bonding to the lengths of wire embedded therein.

While in the circumferential restricting means above defined, the radially innermost layer 9 is wider than the middle layer 10 and the radially outermost layer 11 is narrowest, any step-off arrangement of the respective layers may be employed as is well-known in the art. It is also possible to form the circumferentially restricting arrangement of two layers and, of course, more than three may be employed if the application demands it.

The radial ply layers 7 and 8 are identical. As can be seen by reference to FIGS. 2 and 3, these layers are composed of cords 7a and 8a which are mutually parallel and the cords in each layer lie in side-by-side relationship and extend from one bead to the other. This is accomplished in conventional fashion by a friction coating operation utilizing a calender. The individual cords 7a and 8a are, in accordance with the present invention, produced from a high strength synthetic material such as nylon, which is preferred, although rayon and the terephthalate polyester type material, marketed for instance, under the trade name Dacron, as well as other high strength synthetic materials, may also be employed. Most preferably the cord is fabricated of a large gauge assembly of yarn bundles. Such an assembly may be conveniently defined as a 3360 denier/3 nylon cord. The latter nylon cord may be produced in several different ways. Thus, one may combine by twisting six yarn elements each of 1680 denier, each yarn element being composed of 280 ends or filaments of the synthetic materials. One may also combine three bundles of 3360 denier yarn by twisting. It is also possible to achieve the desired cord by first twisting two 1680 denier yarns into a ply assembly followed by a further combining of 3 of said plies into a cord assembly. The latter would then be more aptly described as a 1680 denier/2/3 cord. By whichever of the above methods utilized, the final cord preferably should, in accordance with the present invention, have a cord gauge of about .047 inch. The cord as described weighs 0.86 pound per one thousand feet and has a tensile strength of 174 pounds. The 1680/2/3 nylon cord as described, when incorporated into the two separate plies 7 and 8 yields a total weight which is a little less than half that of a single ply construction utilizing, for instance, 5 x 7 wire cord. In preparing the cord from the nylon yarn, conventional techniques of twisting in various combinations of S and Z directions may be employed. Nylon cord, of course, has been employed in tire carcass constructions heretofore, however, the denier normally employed has consisted of two bundles of 840 denier nylon yielding a gauge of 0.021 inch. It is obvious, therefore, the nylon cord construction employed in the present invention is both stronger and of heavier gauge than the heretofore conventional nylon tire cord.

Figure 3:
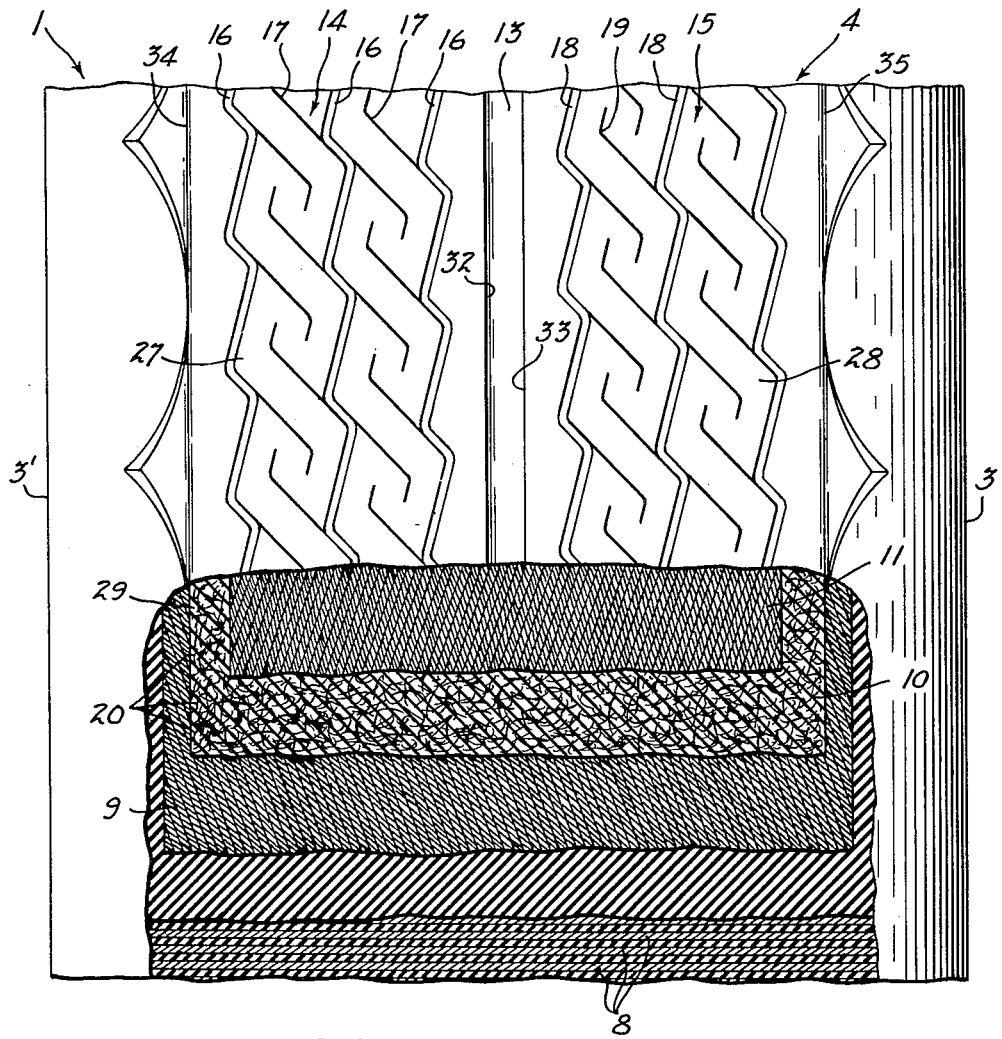
FIGURE 3 is a plan view of the tread portion of the pneumatic tire of the present invention with portions removed to illustrate the novel features of the construction thereof.

Preferably nylon cords 7a and 8a are stretched while exposed to temperature in the neighborhood of 350°–450° F. in order to reduce the propensities of the cord to contract during further processing steps undergone in the manufacture of the tire or after being formed into tire configuration. In some cases it is desirable to loosely weave the cords 7a and 8a employing a weft filament 31 (FIG. 3). The weft element or pick serves to help maintain the cords in mutually parallel relationship as they are friction coated on the calender as described hereinabove.

Figure 2:
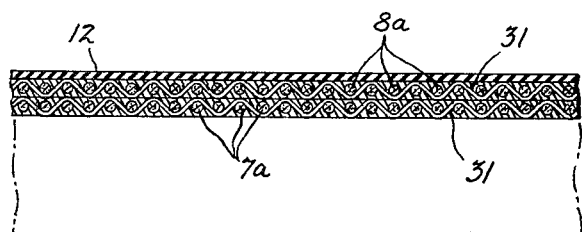
FIGURE 2 is a sectional view slightly enlarged taken on the lines 3—3 of FIGURE 1.

The tire shown in FIGS. 1 and 2 is a medium sized truck tire and it is contemplated that the present invention will find most application in truck tires and off-the-road tires. Larger tires may require nylon cords which are even heavier and stronger than the 3360 denier/3 bundle (or 1680 denier/2/3) nylon cords. The cord size and strength may readily be determined by those skilled in the art of tire design.

For purposes of illustrating an actual tire, I have shown each tread band (FIG. 2) as provided with a slip resistant rib-in-groove pattern. Thus, band 14 is provided with zig-zag tread groove formations 16 and 17. Band 15 is similarly provided with tread formations 18 and 19. A tread of the foregoing configuration and design will furnish desirable traction. It, of course, must be appreciated that this design represents only one of a number that may be employed and as such, the design of the tread constitutes no part of the present invention.

An important feature of the present invention are the two bands 14 and 15 of the tread portions separated by the deep central groove 13. When the vehicle is traveling in a straight line, the two bands support substantially equal portions of the load. When the vehicle is traveling around a curve, the greater portion of the load and also lateral or sideway thrust is imposed upon the outside band, that is, the band furthest out from the center of the curve about which the tire is turning. This reaction deflects the tire inwardly at the sidewall of the outside band which in turn increases the thrust on the tire wall of the inside band. The air pressure in the tire will distribute these forces over the tire and actually increases the thrust on the inside band, with the result that its ground-engaging surface is urged outward. As a consequence, it grips the ground better, distributes the load better, and stabilizes the tire against side sway, which is an inherent disadvantage of the usual radial cord tires.

In the foregoing description it will be appreciated that the various particular features described combine to provide a tire construction which is peculiarly and novelly adapted to meet the normally stringent requirements of, particularly, the heavy duty type, such as truck and off-the-road equipment. In such applications, the circumferentially restricting band type of tire is particularly desirable and the provisions of the present invention for a two-radial ply carcass employing heavy gauge radially disposed cords, permitting at the same time, employment of double bead construction, yields the optimum propensity to meet any inherent weaknesses.

Tires embodying features described hereinabove may be produced by conventional tire building techniques and such need no further description, and the building of the tire is not a part of the present invention.

The portions of the tire not specifically commented upon herein are conventional and well-known to those skilled in the art.

It is to be understood that in accordance with the provisions of the patent statutes, variations and modifications of the specific devices herein shown and described, may be made without departing from the spirit of the teachings hereof.

What I claim is:

1. A heavy duty pneumatic rubber truck tire comprising a tread portion with a narrow, deep, central, circumferentially continuous groove therein which separates it into two crowned, ground-engaging bands having their inner edges adjacent said central groove and extending to a side edge of the tread portion, the distance between the side edges of such tread being substantially less than the maximum internal width of the tire carcass, two wire bead rings in each tire bead portion; radial ply layers of high strength, nylon cord material, each ply layer having radial cords extending from one bead ring on one side of said tire through the carcass to the corresponding bead ring on the other side of said tire; and circumferential restricting means outwardly of said radial ply layers for improving the lateral stability of the tire, said restricting means having a width greater than said first-named distance and comprising a first layer of parallel wire cords arranged at an acute angle relative to the plane of the central groove, a second layer of short lengths of steel wire arranged in a rubber matrix, and a third layer of parallel wire cords arranged at an acute angle relative to the plane of the central groove, the inclination of the cords of the first layer relative to said plane being opposite that of the cords of said second layer.

2. A radial cord tire as defined in claim 1 wherein the wires of said second layer have a length of about ¼ to 2 inches and comprise 15 to 50 percent of the weight of said second layer, the material of said second layer has a tensile strength of at least 5000 pounds per square inch, and each of the radial nylon cords is a twisted multiple-strand cord with a gauge of at least 0.047 inch.

3. A pneumatic tire according to claim 1 in which the circumferential restricting means comprises an innermost layer of substantially inexpansible wire cord each wire of which makes an angle of from 15 to 35° with the plane of the central groove, a middle layer of from 15 to 50% by weight of short length of steel wire calendered into a highly reinforced, high strength rubber matrix, and an outer layer of substantially inexpansible wire cord making the same angle with said central groove as said inner layer but opposite to the angle of said inner layer.

4. A heavy duty pneumatic rubber truck tire comprising a tread portion with a narrow, deep, central, circumferentially continuous groove therein which separates it into two crowned, ground-engaging bands having their inner edges adjacent said central groove and extending to a side edge of the tread portion, the distance between the side edges of such tread being substantially less than the maximum internal width of the tire carcass, two wire bead rings in each tire bead portion; radial ply layers of high strength, nylon cord material, each ply layer having radial cords extending from one bead ring on one side of said tire through the carcass to the corresponding bead ring on the other side of said tire; and circumferential restricting means outwardly of said radial ply layers for improving the lateral stability of the tire, said restricting means having a width greater than said first-named distance and comprising a first layer of parallel wire cords arranged at an acute angle relative to the plane of the central groove, and another layer of parallel wire cords arranged at an acute angle relative to the plane of the central groove, the inclination of the wire cords of the first layer relative to said plane being opposite that of the wire cords of said other layer.

References Cited in the file of this patent

UNITED STATES PATENTS

| | | |
|---|---|---|
| 956,928 | Bonnet | May 3, 1910 |
| 2,960,139 | Engstrom et al. | Nov. 15, 1960 |
| 2,976,905 | Beckadolph | Mar. 28, 1961 |
| 3,018,814 | Saint-Paul | Jan. 30, 1962 |

FOREIGN PATENTS

| | | |
|---|---|---|
| 381,365 | Great Britain | Oct. 6, 1932 |
| 1,214,031 | France | Nov. 2, 1959 |